United States Patent [19]

Gauthier

[11] Patent Number: 4,586,942

[45] Date of Patent: May 6, 1986

[54] PROCESS AND PLANT FOR THE COOLING OF A FLUID AND IN PARTICULAR THE LIQUEFACTION OF NATURAL GAS

[75] Inventor: Pierre Gauthier, Fresnes, France

[73] Assignee: L'Air Liquide, Societe Anonyme pour l'Etude et l'Exploitation des Procedes Georges Claude, Paris, France

[21] Appl. No.: 575,541

[22] Filed: Jan. 31, 1984

[30] Foreign Application Priority Data

Feb. 8, 1983 [FR] France ............... 83 01919

[51] Int. Cl.$^4$ ............................................. F25J 3/00
[52] U.S. Cl. ........................................ 62/28; 62/30; 62/31; 62/34; 62/40
[58] Field of Search ............. 62/40, 9, 11, 23, 27, 62/28, 29, 30, 31, 32, 34

[56] References Cited

U.S. PATENT DOCUMENTS 3,857,251 12/1974 Alleaume ...................... 62/40

Primary Examiner—Frank Sever
Attorney, Agent, or Firm—Young & Thompson

[57] ABSTRACT

This process is of the type in which there is compressed in at least two stages 2, 6 a mixture of cooling fluids composed of constituents of different volatilities and in which, after the last stage 6 and after at least an intermediate compression stage 2, the mixture is partly condensed, the condensed fractions are expanded and vaporized in heat exchange with the fluid to be cooled before being compressed again. According to the invention, at least one of the condensation stages is carried out by sending to a distillation column 7 the mixture issuing from the corresponding stage of the compressor. This enables the thermodynamic irreversibility to be decreased and consequently permits a reduction of the specific cooling energy.

11 Claims, 4 Drawing Figures

PROCESS AND PLANT FOR THE COOLING OF A FLUID AND IN PARTICULAR THE LIQUEFACTION OF NATURAL GAS

The present invention relates to a process and a plant for cooling a fluid which apply in particular to the liquefaction of natural gas. It concerns first of all a cooling process of the type in which a cooling mixture composed of constituents having different volatilities is compressed in at least two stages and in which, after the last compression stage and after at least one intermediate compression stage, the mixture is partly condensed, and the condensed fractions are expanded and vaporized in heat exchange with the fluid to be cooled before being compressed again.

In processes of this type, the condensation of a slightly volatile fraction effected after said intermediate stage, has for purpose to provide an increased cooling effect in the warm part of the heat exchange line at the cost of a low specific energy owing to the reduced rate of compression of this fraction. This slightly volatile fraction permits the reduction in this region of the temperature difference between the cooling mixture and the fluid or fluids to be cooled, which difference corresponds to a thermodynamic irreversibility.

However, the resulting gain is marked only if the mixture thus condensed at medium pressure has a sufficiently high bubble temperature and/or if its flow rate is sufficiently high. In particular, in the case of the liquefaction of natural gas, where the cooling mixture is usually constituted by a mixture of $C_1$ to $C_5$ hydrocarbons with, if desired, a small proportion of nitrogen, so as to be able to produce a cooling effect at optimum temperature levels, it is necessary to render the mixture heavier in order to achieve a marked saving of energy.

It has been proposed for this purpose to introduce in the cooling mixture very heavy hydrocarbons, for example hexane. However, a part of these very heavy hydrocarbons is present in the high pressure vapour which is cooled and liquefied so as to provide, after expansion, the cooling effect required in the cold part of the exchange line. As hexane solidifies at $-94°$ C. and is only slightly soluble in methane at low temperatures, there must be provided on the heat exchange line, in order to avoid the clogging of this line, a certain number of interruptions for eliminating the hexane by stepped condensation before it reaches its solubility limit. This results in a complex exchange line having many heat exchangers in series.

An object of the invention is to reduce the compression energy without the use of constituents which are liable to become solidified in the cold part of the exchange line.

The invention therefore provides a cooling process of the afore-mentioned type, wherein at least one of the condensation stages is carried out by sending into a distillation column the mixture issuing from the corresponding stage of the compressor.

In a first manner of carrying out the invention, the distillation is effected solely after the last compression stage, and the condensate resulting from this distillation, and the other condensate or condensates, are sub-cooled to the same temperature and, after expansion, united in the same pipe before being put into heat exchange relation with the fluid to be cooled.

In a second manner of carrying out the invention, a distillation is carried out at an intermediate compression stage of the condensate resulting from the distillation is sub-cooled to a first temperature and the condensate of the following compression stage or stages are sub-cooled to a second temperature lower than the first temperature.

Another object of the invention is to provide a plant for carrying out such a process.

This plant is of the type comprising a refrigeration circuit in which is circulated a cooling mixture and which includes a compressor having at least two stages each provided with a cooler, and a liquid-vapour separator following on the cooler of the last stage and following on that of at least an intermediate stage relative to the flow in said circuit, wherein there is interposed between the cooler associated with at least one of the separators and the corresponding compressor stage a distillationn column which is heated by the gas compressed by said compressor stage in which is refluxed the liquid issuing from the separator.

Several embodiments of the invention will now be described by way of example with reference to the accompanying drawings in which.

Figure 1:
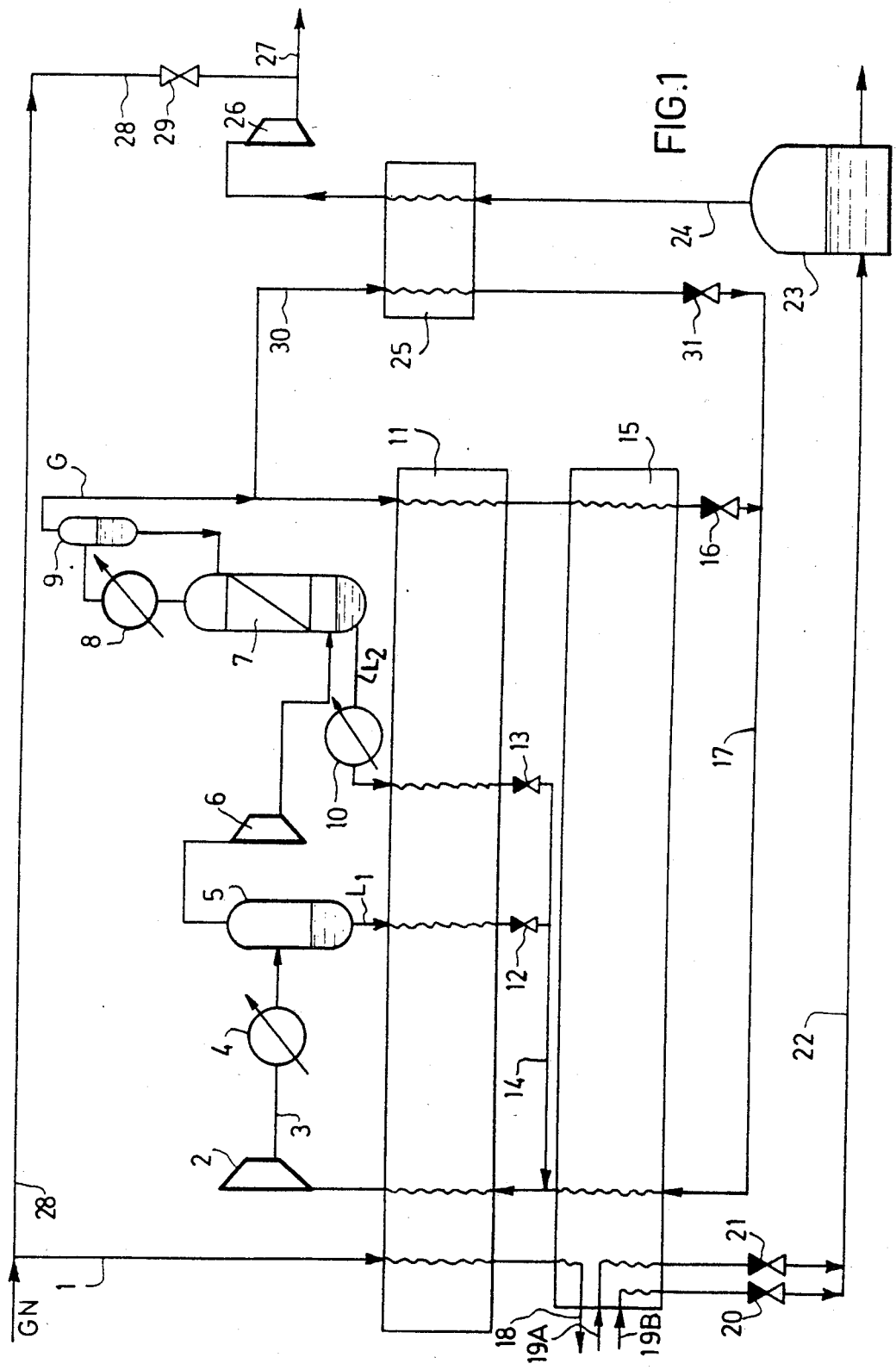
FIG. 1 is a diagram of a natural gas liquefaction plant according to the invention.

The plant shown in FIG. 1 is adapted to cool, liquefy and sub-cool natural gas flowng in a pipe 1 at ambient temperature at a pressure of the order of 40 or 50 bars. This plant employs for this purpose a cooling cycle of the so-called incorporated cascade type. This cycle is closed in that the cooling mixture circulates in pipes completely separated from the pipe 1.

The cooling mixture is a mixture of $C_1$ to $C_5$ hydrocarbons, for example methane, ethane, propane, butane and pentane, and nitrogen. It is compressed in two stages: it is drawn in at low pressure (of the order of 3 bars) by a first compressor stage 2 which discharges it at medium pressure (of the order of 12 bars) into a pipe 3. The mixture passes through an intermediate cooler 4 supplied with sea water where it is partly condensed. The two phases are separated in a separator 5 and the resulting vapour is compressed at high pressure (of the order of 50 bars) by a second compressor stage 6.

The gas issuing from the latter at about 140° C. is directly sent to the lower portions or tank of a distillation column 7 having a very small number of theoretical plates, for example two theoretical plates. The head vapour is cooled and partly condensed in a cooler 8 which also employs sea water and the condensate, which is received in a separator 9, is refluxed in the column 7.

Thus three fluids are available for producing the cooling effect for cooling and liquefying the natural gas: a first liquid L1, at medium pressure, which is the liquid received in the separator 5; a second liquid L2, at high pressure, which is the tank liquid of the column 7; and the gas G issuing from the final separator 9. The liquid L1 and the gas G are at subsequently the same temperature, of the order of 40° C., imposed by the use of sea-water in the coolers 4 and 8. The liquid L2 is brought back to substantially the same temperature by passage through a sea-water cooler 10.

The three fluids L1, L2 and G pass travel in co-current manner with the natural gas through a first heat exchanger 11 which constitutes the "warm" part of the heat exchange line. At the cold end of the exchanger 11, namely at a temperature of the order of −40° to −60° C. corresponding to a sufficient sub-cooling of the liquids L1 and L2, these two liquids are expanded to low pressure in respective relief-valves 12 and 13 and then united in a pipe 14 and vaporized in counter-current manner with respect to the natural gas in the exchanger 11, the vapour being super-heated in the warm part of this exchanger and then brought back to the intake side of the compressor stage 2 at roughly ambient temperature.

After having passed through the exchanger 11 where it is partly condensed, the gas G passes through a second heat exchanger 15 where it is completely liquefied and sub-cooled; at the cold end of the exchanger 15, that is at the final temperature desired for the natural gas liquefied at high pressure (−150° C. to −161° C.), this liquid, which is sufficiently sub-cooled, is expanded to low pressure in a relief-valve 16 and sent through a pipe 17 to be vaporized in the exchanger 15 in a counter-current manner with respect to the natural gas. The vapour is then united with the liquids L1 and L2 flowing in the pipe 14 so that these three fluids together form a diphase fluid which vaporizes and provides the required cooling effect in the exchanger 11.

The plant may be completed as shown by the following arrangements.

At a certain level of the cold exchanger 15, carrying the reference numeral 18, the natural gas is brought out of this exchanger and sent to a gasoline-extracting unit (not shown) where certain heavy products are extracted. The remaining products, for example at two different pressures, are reintroduced at 19A and 19B in the exchanger 15 so as to complete their cooling, their liquefaction and their sub-cooler.

The two sub-cooled fractions of the natural gas are expanded as they leave the exchanger 15 in one or more steps to a pressure in the neighbourhood of atmospheric pressure in respective relief-valves 20 and 21 and then united in a pipe 22 so as to be sent to a storage tank 23. The vapour formed in this tank, which brings the liquefied natural gas to its equilibrium temperatures of about −161° C., is discharged through a pipe 24, passes through a heat exchanger 25 where it is heated and is recompressed by a compressor 26 for sending through a pipe 27 to the "fuel gas" utilization network. Further, a branch pipe 28, connected to the pipe 1 upstream of the exchanger 11 and equipped with a relief-valve 29, enables an additional supply of gaseous natural gas to be sent to the pipe 27 if necessary.

The cooling effect of the boil-off of the storage in the exchanger 25 cools a part of the gas G in a counter-current manner. For this purpose, a pipe 30 is connected to the pipe of the gas G between the separator 9 and the exchanger 11 and passes through the exchanger 25, in which the gas G is liquefied and sub-cooled. This liquid is expanded to low pressure in a relief-valve 31 and then mixed with the low-pressure fluid issuing from the relief-valve 16.

It will be understood that, by way of a modification, the cooling effect of the boil-off of the storage may serve to cool and liquefy a fraction of the initial natural gas.

This plant shown in FIG. 1 will now be compared with a plant which is similar but in which the gas issuing from the second compressor stage 6 would pass directly into the cooler 8, according to the prior art.

In the latter case, a mixture having a given composition and flow rate results in a high-pressure vapour of determined composition and flow rate, and the high pressure liquid sent to the warm exchanger 11 is the liquid in equilibrium with this vapour. When the distillation column 7 is interposed, a distinctly lighter vapour G and a distinctly heavier liquid L2 are obtained at high pressure.

In practice, the flow rate and the composition of the high-pressure vapour are predetermined so as to ensure the cooling balance in the exchanger 15. The foregoing reasoning shows that the invention gives the same composition of high-pressure vapour with a mixture that is heavier than in the prior art. This heavier mixture will produce a higher flow rate of liquid L1 in the separator 5 for given pressure and temperature. But, on the other hand, as the flow of the vapour G is predetermined, the sum of the flow rates of the liquids L1 and L2 is also predetermined, as a first approximation, for ensuring the cooling balance in the exchanger 11.

It is clear from the foregoing that the insertion of the column 7 increases the flow of the medium-pressure liquid and decreases the flow of the high-pressure liquid. Consequently, there is less vapour to be compressed in the second stage 6, and this represents a specific liquefaction energy gain.

Further, the fluid L1+L2 is rendered heavier; as it concerns a mixture of hydrocarbons, its vaporization heat is increased. Consequently, a lower overall flow is sufficient to ensure the cooling balance in the exchanger 11, which also contributes to a reduction in the compression energy.

It can be seen that the high-pressure circuit requires no interruption since the fluid G flowing therein contains no components liable to be solidified therein. In practice, such components could be tolerated as impurities in the cycle mixture, in a proportion which is low enough to avoid exceeding their solubility limit in the other constituents of the mixture of the employed range of temperatures. Further, the sole interruptions required in the medium-pressure and low-pressure circuits consist in withdrawing the liquids L1 and L2 at medium pressure and simultaneously reinjecting them at low pressure. Consequently, although the exchange line has been shown to include two distinct exchangers 11 and 15, it is quite possible to provide a single heat exchanger covering the whole range of temperatures of the treatment of the natural gas.

From the thermodynamic point of view, the energy gain achieved can be explained in two ways:

(a) As concerns the final cooler: in the absence of the column 7, the final cooler of the two-stage compressor achieves a heat exchange between a warm source (sea water) at a temperature of the order of 30° C. and a cooling fluid which issues from the second compressor stage at a temperature of the order of 140° C. and which starts to condense at about 120° C. A considerable transfer of heat has therefore occurred under highly irreversible conditions. On the other hand, with the column 7, the high temperature of the compressed fluid is employed for effecting a distillation, and the head vapour which reaches the cooler 8 is at a distinctly lower temperature. The heat exchange conditions in this cooler are therefore much closer to reversibility. It is true that the aforementioned temperature difference is found in the cooler 10 which constitutes with the cooler 8 the final cooler of the compressor, but this concerns a cooling without any change in phase, which employs much smaller heat quantities.

Figure 2:
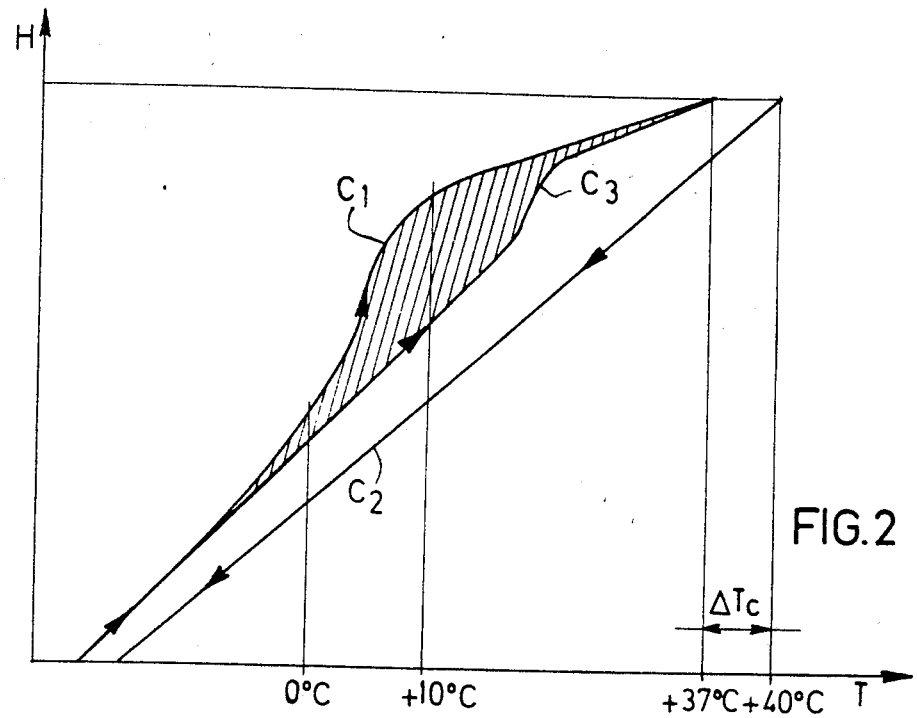
FIG. 2 is a diagram illustrating the advantage afforded by such a plant.

(b) As concerns the warm exchanger 11: there will now be considered the exchange diagram of the warm part of the exchange line shown in FIG. 2, in which the temperatures have been plotted as abscissae and the enthalpies as ordinates (in order to render the drawing more clear, the temperature differences have been exaggerated in this figure): in the absence of the column 7, the expanded fluid L1+L2, which is too light, is vaporized too rapidly in the intermediate part of the exchanger 11 for example between 0° C. and +10° C. Consequently, the temperature difference between, on the one hand, the cooling mixture being reheated (curve C1) and, on the other hand, the natural gas and the cooling mixture being cooled (curve C2) considerably increases in this zone, which corresponds to a high thermodynamic irreversibility. On the other hand, with the mixture rendered heavier obtained in accordance with the invention, the vaporization in the exchanger 11 is more gradual and the mixture is represented by the curve C3, which is much closer to the curve C2. In FIG. 2, $\Delta T_c$ represents the difference at the warm end of the exchanger 11, which is initially predetermined.

It should be noted that a substantial energy gain, of the order of 10%, may be achieved with a column 7 having a very small number of plates, for example two theoretical plates. The corresponding plant investment is therefore very limited.

Figure 3:
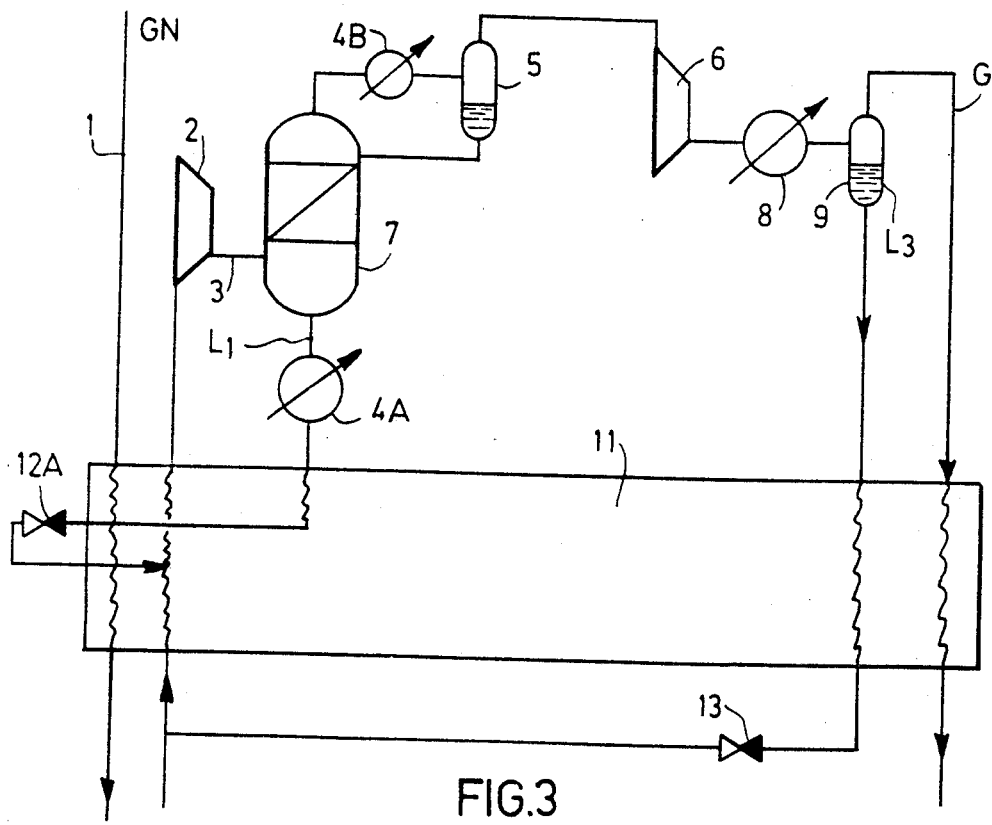
FIGS. 3 and 4 are partial diagrams of two other embodiments of the plant according to the invention.

The plant shown in FIG. 3, only the relevant parts of which have been represented, differs from that of FIG. 1 in that the distillation column 7 follows on the first compressor stage 2 and the gas issuing from the second compressor stage 6 passed directly into the final cooler 8 and then into the separator 9, the liquid L3 of which is sent to the exchanger 11. More precisely, the mixture compressed in the first stage 2 is directly sent through the pipe 3 to the tank of the column 7; the tank liquid (liquid L1) passes into a cooler 4A; the head vapour passes into a cooler 4B and then into the separator 5, the liquid received in the latter being refluxed in the column 7 while the vapour is drawn into the second compressor stage 6.

This plant may again be compared with a plant of the prior art devoid of a distillation column, i.e. in which the pipe 3 leads directly to the cooler 4B and in which the liquid received in the separator 5 is directly sent to the exchanger 11; for given flow rate and composition of the high-pressure gas G, the liquid L3 contained in the separator 9 has a given composition. The intermediate pressure between the two compression stages defines the flow rate of the liquid L3 which permits obtaining a mixture whose dew point is the temperature of the separator 5. The flow rate and composition of the vapour issuing from the separator 5 are consequently unchanged. In the absence of the column 7, the liquid L1 is in equilibrium with said vapour; with the column 7, as the liquid L1 is heavier, it has an increased vaporization heat, so that a lower flow rate is sufficient to ensure the cooling balance of the exchanger 11.

As the liquid L1 is very heavy, it is desirable to subcool it to an intermediate point of the exchanger 11, as shown in FIG. 3, before expanding it to low pressure in a relief-valve 12A and then reinjecting it into the exchanger 11 at the same temperature, for example $-10°$ C., for its vaporization, mixed with the already expanded two high-pressure fluids L3 and G. In proceeding in this manner, the liquid L1 does not hinder the vaporization of the lighter liquid L3.

Thus, the flow rate compressed by the first stage 2 is reduced and the cooling effect of the liquid L1 occurs at a higher temperature level, precisely in the excessive temperature difference zone seen in FIG. 2. From the thermodynamic point of view, the introduction of the column 7 reduced the irreversibility, on the one hand, at the warm source 4B for the same reason as in the case of FIG. 1 and, on the other hand, by the reduction of the temperature difference in the warm part of the exchange line.

Figure 4:
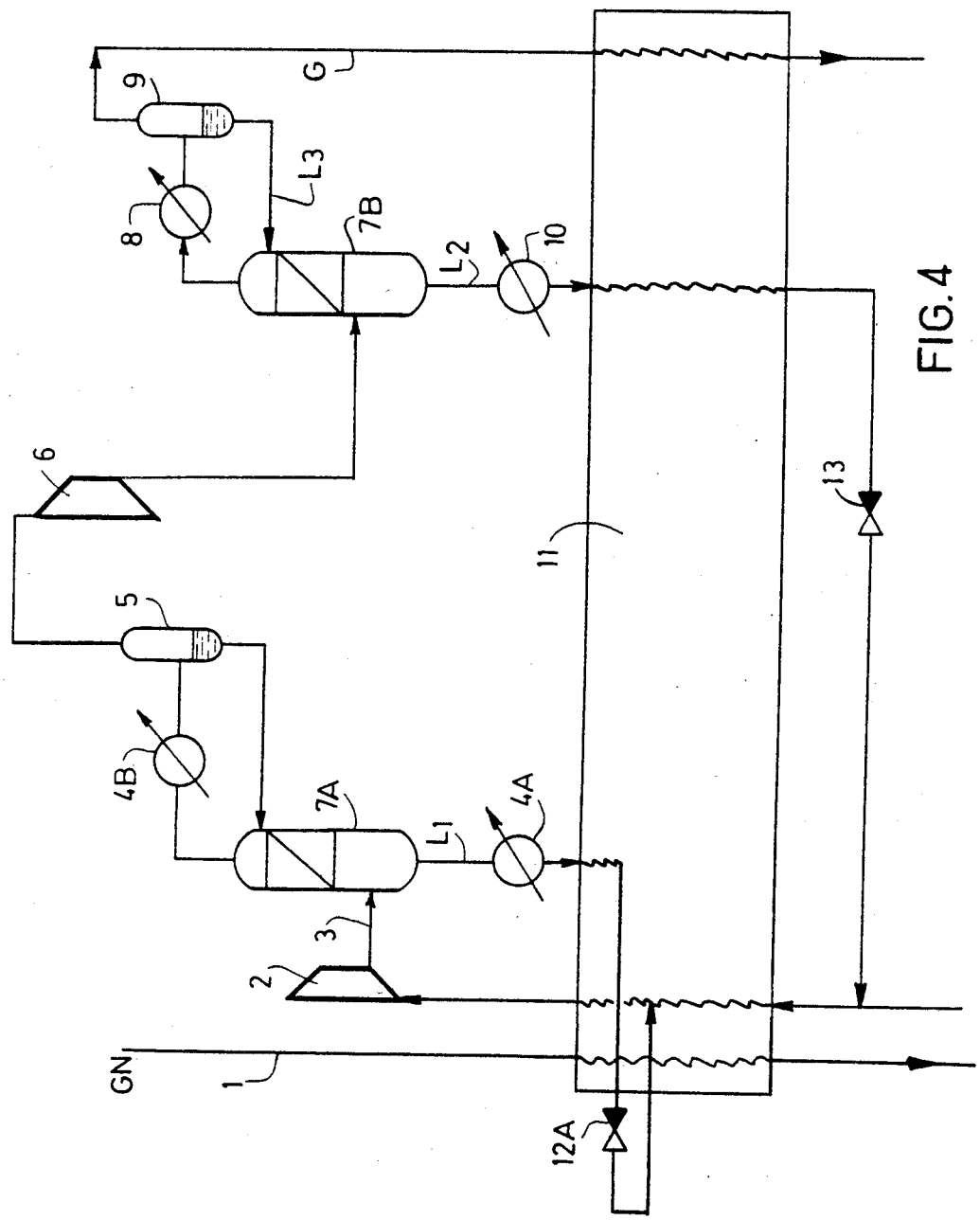

As shown in FIG. 4, it is possible to combine the solutions of FIGS. 1 and 3 by using a distillation column at each compression stage. Thus, the discharge pipe 3 of the first stage 2 leads directly to the tank of a first distillation column 7A. The tank liquid L1 passes into a sea-water cooler 4A and is sub-cooled in the warm part of the exchanger 11. The head vapour passes into a sea-water cooler 4B and then reaches a separator 5. The liquid received in the latter is refluxed in the column 7A while the vapour is supplied to the second compressor stage 6. The gas issuing from the latter is directly supplied to the tank of a second distillation column 7B. The tank liquid L2 passes into a sea-water cooler 10 and is sub-cooled in passing through the whole of the exchanger 11. The head vapour passes into a sea-water cooler 8 and then reaches a separator 9. The liquid L3 received in the latter is refluxed in the column 7B while the vapour G constitutes the high-pressure cooling fluid.

It is clear that the plant shown in FIG. 4 affords all of the advantages of those of FIGS. 1 and 3. Consequently, at the cost of a moderate additional investment, there is obtained a marked specific liquefaction energy gain relative to the plants of the prior art.

In each of the plants described hereinbefore, the or each distillation column 7, 7A, 7B is heated by the direct injection into the column of the compressed gas issuing from the corresponding compressor stage 2 or 6. By way of a modification, this compressed gas could pass through a heat exchanger coil disposed in the tank of the column and heating the latter, before being injected into the column at a suitable height.

I claim:

1. In a process comprising cooling a fluid from about ambient temperature to a low temperature while reducing the consumption of compression energy and precluding the need to use refrigerant constituents which are liable to become solidified in the cold part of the exchange line, by providing a cooling mixture of about ambient temperature and at a first pressure, said mixture being composed of constituents of different volatilities; compressing said mixture in at least two compression steps; after the last compression step and after at least one intermediate compression step, precooling the compressed mixture by heat exchange with a cold source at about ambient temperature to obtain a liquid fraction and a vapor fraction at about ambient temperature; sub-cooling said liquid fraction to a temperature between ambient temperature and said low temperature, expanding the same and vaporizing it in heat exchange relation with said fluid to be cooled; and liquefying and sub-cooling the last step vapor fraction to said low temperature, expanding the same and vaporizing it in heat exchange relation with said fluid to be cooled; the improvement comprising performing at least one of said precooling steps by sending the mixture compressed in the respective compression step to a distillation column, precooling to about ambient temperature by means of said cold source an overhead gas of said column to produce said vapor fraction and a reflux liquid for said column, and precooling to about ambient temperature by means of said cold source a bottom liquid of said column to produce said liquid fraction.

2. A process according to claim 1 wherein the distillation is carried out solely after the last compression step and said liquid fractions are sub-cooled to the same temperature and, after expansion, united in a common pipe before being put into heat exchange relation with said fluid to be cooled.

3. A process according to claim 1, comprising effecting a distillation at an intermediate compression step and sub-cooling the respective liquid fraction to a first temperature and the liquid fraction of each following compression step to a respective second temperature lower than said first temperature.

4. A process according to claim 1, comprising liquefying and storing said fluid in a liquid state in a storage tank, and liquefying and sub-cooling a part of the last step vapor fraction in heat exchange relation with vapor produced in said storage tank.

5. A process according to claim 1, wherein all the liquid fractions are expanded to the same pressure.

6. A process according to claim 5, wherein said same pressure is said first pressure.

7. In a process comprising cooling a fluid from about ambient temperature to a low temperature while reducing the consumption of compression energy and precluding the need to use refrigerant constituents which are liable to become solidified in the cold part of the exchange line, by providing a cooling mixture at about ambient temperature, said mixture being composed of constituents of different volatilities; compressing said mixture; precooling the compressed mixture by heat exchange with a cold source at about ambient temperature to obtain a liquid fraction and a vapor fraction at about ambient temperature; cooling said liquid fraction to a temperature between ambient temperature and said low temperature, expanding the same and vaporizing it in heat exchange relation with said fluid to be cooled; and liquefying and sub-cooling the vapor fraction to said low temperature, expanding the same and vaporizing it in heat exchange relation with said fluid to be cooled; the improvement comprising performing said precooling step by sending the compressed mixture to a distillation column, precooling to about ambient temperature by means of said cold source an overhead gas of said column to produce said vapor fraction and a reflux liquid for said column, and precooling to about ambient temperature by means of said cold source a bottom liquid of said column to produce said liquid fraction.

8. In apparatus comprising means designed for cooling a fluid from about ambient temperature to a low temperature while reducing the consumption of compression energy and precluding to need to use refrigerant constituents which are liable to become solidified in the cold part of the exchange line, including means for providing a cooling mixture at about ambient temperature and at a first pressure, said mixture being composed of constituents of different volatilities; means for compressing said mixture in at least two compression steps; after the last compression step and after at least one intermediate compression step, means for precooling the compressed mixture by heat exchange with a cold source at about ambient temperature to obtain a liquid fraction and a vapor fraction at about ambient temperature; means for sub-cooling said liquid fraction to a temperature between ambient temperature and said low temperature and for expanding the same and vaporizing it in heat exchange relation with said fluid to be cooled; and means for liquefying and sub-cooling the last step vapor fraction to said low temperature and for expanding the same and vaporizing it in heat exchange relation with said fluid to be cooled; the improvement comprising means for performing at least one of said precooling steps by sending the mixture compressed in the respective compression step to a distillation column, means for precooling to about ambient temperature by means of said cold source an overhead gas of said column to produce said vapor fraction and a reflux liquid for said column, and means for precooling to about ambient temperature by means of said cold source a bottom liquid of said column to produce said liquid fraction.

9. Apparatus according to claim 8 wherein the distillation is carried out solely after the last compression step and said liquid fractions, after expansion, are united in a common pipe before being put into heat exchange relation with said fluid to be cooled.

10. Apparatus according to claim 8, comprising means for liquefying and storing said fluid in a liquid state in a storage tank, and means for liquefying and sub-cooling a part of the last step vapor fraction in heat exchange relation with vapor produced in said storage tank.

11. In apparatus comprising means designed for cooling a fluid from about ambient temperature to a low temperature while reducing the consumption of compression energy and precluding the need to use refrigerant constituents which are liable to become solidified in the cold part of the exchange line, including means for providing a cooling mixture at about ambient temperature, said mixture being composed of constituents of different volatilities; means for compressing said mixture; means for precooling the compressed mixture by heat exchange with a cold source at about ambient temperature to obtain a liquid fraction and a vapor fraction at about ambient temperature; means for cooling said liquid fraction to a temperature between ambient temperature and said low temperature and for expanding the same and vaporizing it in heat exchange relation with said fluid to be cooled; and means for liquefying and sub-cooling the vapor fraction to said low temperature and for expanding the same and vaporizing it in heat exchange relation with said fluid to be cooled; the improvement comprising means for performing said precooling step by sending the compressed mixture to a distillation column, means for precooling to about ambient temperature by means of said cold source an overhead gas to said column to produce said vapor fraction and a reflux liquid for said column, and means for precooling to about ambient temperature by means of said cold source a bottom liquid of said column to produce said liquid fraction.

* * * * *